United States Patent [19]

Mahan

[11] Patent Number: 4,657,299
[45] Date of Patent: Apr. 14, 1987

[54] PICKUP TRUCK TENT POLE ANCHOR, OPERATIONAL COMBINATION UTILIZING SAME, AND METHOD

[76] Inventor: Richard L. Mahan, Rte. 12, Box 74, Bentonville, Ark. 72712

[21] Appl. No.: 833,973

[22] Filed: Feb. 27, 1986

[51] Int. Cl.⁴ .................................. E04H 15/06
[52] U.S. Cl. .......................... 296/159; 296/167; 296/43; 403/227; 135/88
[58] Field of Search ............... 296/43, 156, 159, 160, 296/163, 164, 167; 135/88, 102; 403/224, 225, 227

[56] References Cited

U.S. PATENT DOCUMENTS

| | | | |
|---|---|---|---|
| Re. 29,264 | 6/1977 | Woodward | 296/159 |
| 2,621,836 | 12/1952 | McMiller | 224/42.1 |
| 3,354,891 | 11/1967 | Brown | 296/164 |
| 3,623,690 | 11/1971 | Bargman, Jr. | 410/116 |
| 3,649,063 | 3/1972 | Stark | 296/159 |
| 3,734,110 | 5/1973 | Burns | 296/10 |
| 3,737,190 | 6/1973 | Smith | 296/159 |
| 3,746,386 | 7/1973 | Woodward | 296/167 |
| 3,841,695 | 10/1974 | Woodward | 403/227 X |
| 4,093,302 | 6/1978 | Adams | 296/100 |
| 4,191,108 | 3/1980 | Jones | 296/43 X |
| 4,215,894 | 8/1980 | Sidlinger | 135/88 X |
| 4,222,400 | 9/1980 | Reimer | 135/88 |
| 4,263,925 | 4/1981 | Arganbright | 135/88 X |
| 4,294,484 | 10/1981 | Robertson | 296/156 |
| 4,295,765 | 10/1981 | Burke | 296/167 X |
| 4,296,960 | 10/1981 | Winchester | 296/167 |
| 4,310,194 | 1/1982 | Biller | 296/159 |
| 4,352,362 | 10/1982 | Nichols | 135/98 |
| 4,504,049 | 3/1985 | Straub | 296/165 |
| 4,574,963 | 3/1986 | Fullenkamp et al. | 403/227 X |

*Primary Examiner*—Robert B. Reeves
*Assistant Examiner*—Russell D. Stormer
*Attorney, Agent, or Firm*—Litman, Day and McMahon

[57] ABSTRACT

An anchor for insertion in, and securement to, a stake receiving pocket in a truck such as a pickup truck is provided. The anchor is used in erecting a camper, to secure tent poles or a tent frame to the truck, in order to assemble the camper unit over a bed of the truck. The anchor includes an expandable portion, a bolt mechanism for actuating the expandable portion, and an adjustable socket member for engagement with the tent frame. When used, the expandable member is inserted between generally opposite walls in the stake receiving pocket of the truck. The bolt member is actuated, causing the expandable member to expand and engage the opposite walls, to secure the anchor in position. The socket member is adjustable and may be oriented within the anchor in a preferred position for mounting of the tent frame thereon. A method is provided for assembling a camper unit on a pickup truck bed using the tent pole anchor. Also, an operational combination is provided in which a plurality of anchors are used in association with arching cross members to support a tent covering over the bed of the truck.

11 Claims, 6 Drawing Figures

PICKUP TRUCK TENT POLE ANCHOR, OPERATIONAL COMBINATION UTILIZING SAME, AND METHOD

BACKGROUND OF THE INVENTION

The present invention relates to campers and in particular to anchors used for mounting a camper tent to a vehicle such as a pickup truck. The invention also concerns a method of erecting a tent on a truck.

Conventional pickup trucks generally include a flatbed with sidewalls. The sidewalls often have stake receiving pockets therein. These pockets may be used, for example, to support vertical stakes utilized to retain loads within the truck, when the loads pile higher than the sidewalls of the pickup truck.

Numerous types of camper shells and tent arrangements have been developed for mounting within such pickup trucks. Some of these are collapsible arrangements which are collapsed when the pickup truck is driven from location to location, as for example over a highway, and which are erected at a campsite for use as a camping shelter or the like. Such camper arrangements often utilize a frame which is erected in the bed of the pickup truck.

Numerous methods of attaching a camper frame to the pickup truck frame have been developed. Often these involve the utilization of the stake-holes, either by direct engagement of the camper frame with a stake-hole, or by engagement of the camper frame with an insert which is receivable within the stake-holes or stake receiving pockets.

Conventional methods of attaching a tent frame to the vehicle body suffer numerous disadvantages. For example, often no secure anchoring method is utilized, rather the stakes are simply loosely received within the stake receiving pocket or insert. Thus, the tent would not be securely attached to the truck frame and could be easily lifted by vandals, or the weather, or perhaps by wind forces created while driving the truck a short distance with the camper erected.

In some systems, the tent frame is securely attached to the truck frame, however the method of attachment may require modification in a conventional truck frame such as by the addition of bolted on, or welded on, brackets or the like, or through the drilling of holes for the receipt of bolts or the like. Such methods suffer from being both relatively costly and inefficient, by requiring modifications in the truck frame. These modifications may be undesirable for aesthetic reasons, they may weaken or stress portions of the truck frame or body, and they may require extensive put-up or take-down procedures. Also, such methods might not readily accommodate methods of erecting camper frames which may require minor adjustment in the orientation of portions of the frame to accommodate a canvas-like covering during camper erection.

In some instances, inserts are utilized which are received within the stake receiving pockets and to which tent poles may be attached. Conventional inserts, for utilization with tent poles, generally suffer from having inadequate and inefficient means of actually securing the stake to the stake receiving pocket. Also, such inserts have been somewhat difficult to assemble and operate. Further, conventional inserts have not, generally, provided adequate means to adjust positioning of the tent poles to accommodate different types of tent frames, different types of canvases, or to facilitate erection of the camper.

OBJECTS OF THE INVENTION

Therefore the objects of the present invention are: to provide an anchor especially suited as a tent pole anchor for use in erecting a tent camper unit within a bed of a conventional truck; to provide such an anchor which securely engages the truck and provides for secure engagement or attachment of an erected tent frame to a selected vehicle body; to provide such an anchor which has an adjustable tent pole receiving portion thereon, so that an orientation or extension of a selected tent pole secured to the anchor may be selectively adjusted; to provide such an anchor which includes a selectively expandable plug member receivable within a stake receiving pocket in a truck bed and expandable therein to secure the anchor to the stake receiving pocket; to provide such an anchor in which the expandable member comprises an expandable plug of material having a longitudinal bore therethrough and in which the anchor utilizes a bolt member extending through the longitudinal bore to actuate selective expansion of the plug member; to provide such an anchor which utilizes a tent pole holder comprising a cylindrical tube mounted on a slide to secure the tent pole by receipt of the tent pole within the tube; to provide such an anchor in which the slide is selectively tightened into and locked into a preselected position as the bolt is tightened and the plug member expanded, to secure the anchor within the stake receiving pocket; to provide such an assembly in which the tent pole receiving tube is mounted upon a slide member having two generally parallel prongs which extend on opposite sides of the bolt for adjustably engaging the slide with the bolt, permitting orientation of the tent pole receiving tube to be adjusted; to provide such an anchor which is relatively easy to assemble; to provide such an anchor which is relatively easy to mount in a truck or to dismount therefrom; to provide such an anchor which is relatively inexpensive to produce; to provide such an anchor which is easy to manufacture, simple to use and which is particularly well adapted for the proposed usages thereof; to provide an operational combination of a plurality of such anchors with a tent pole frame and a tent covering, to form a tent; and to provide such an operational assembly and method particularly suited for use with a tent frame comprising first and second arching cross members.

Other objects and advantages of this invention will become apparent from the following description taken in conjunction with the accompanying drawings wherein are set forth, by way of illustration and example, certain embodiments of this invention.

SUMMARY OF THE INVENTION

An anchor is provided for receipt within a stake receiving pocket in a conventional truck, such as a pickup truck, to anchor tent poles or a tent frame to the truck. The tent pole or tent frame which is secured by the anchor may be utilized to support a camper, tent covering, or the like, over a bed of the truck.

The anchor generally includes an expandable member, actuating means for selectively expanding the expandable member, and a tent pole engaging member. The expandable member is selectively receivable within a selected stake receiving pocket in a conventional pickup truck body. Such pockets are generally characterized as having at least a pair of generally opposite sidewalls between which the expandable member is received. Actuating means permit selective expansion of the expandable member into engagement with opposite sidewalls of the pocket, generally locking the expandable member in place through frictional engagement and securing the anchor to the stake receiving pocket.

The tent pole engaging member is appropriately oriented in the anchor, so that when the expandable member is actuated to lock the anchor into the stake receiving pocket, the tent pole engaging member is selectively oriented for support of a selected tent pole over the truck, for erecting a tent frame and placing a tent covering thereon. In the preferred embodiment, the tent pole engaging member is adjustable and selectively positioned to permit a preferred location of the associated tent pole to be achieved. Also, the tent pole engaging member is preferably removable and replaceable, so it may be replaced, as desired, to accommodate different types of tent frames.

It will be understood from the following description that it is contemplated that a plurality of anchors, according to the present invention, would be mountable within a conventional pickup truck to support a plurality of tent poles, i.e. an entire tent frame, over a pickup truck bed. A tarp-like or canvas-like tent covering could then be secured to the tent pole arrangement or frame, providing for a tent mounted within the pickup truck. Such a tent would generally utilize the pickup truck bed as a floor, the pickup truck sidewalls as partial walls, and the tent frame and covering as upper walls and roof.

In the preferred embodiment, the expandable member comprises a generally rectangular plug of material such as rubber. The plug includes a longitudinal bore therethrough. Generally, as the plug is compressed from forces directed along the extension of the longitudinal bore, the plug expands in directions transverse thereto, to retain the plug within a selected stake receiving pocket.

Also in the preferred embodiment, the actuation means comprises a bolt and nut-plate arrangement. The bolt generally extends through the longitudinal bore, and threadably engages a nut-plate adjacent one end of the longitudinal bore. The bolt includes a head portion and, as the bolt is increasingly threadably received within the nut-plate, the plug is squeezed generally between the bolt head and the nut-plate. This action, it will be understood, generally expands the plug in directions tranverse to the longitudinal bore and bolt. This expansion, again, generally secures the anchor to a selected stake receiving pocket.

Also in the preferred embodiment, the tent pole engaging member comprises an adjustably positionable slide member having a tent pole receiving socket or tube mounted thereon. The preferred slide member generally includes a base portion with generally elongate, parallel, spaced prongs extending outwardly therefrom. The tube is mounted on the base portion and is preferably oriented for receipt of a portion of tent pole, or tent pole frame, therein.

The prongs of the slide member are appropriately spaced to be received on opposite ends of the bolt member. In the preferred embodiment, the anchor includes washer members mounted upon the bolt in an appropriate orientation to selectively pinch the slide member prongs therebetween. As the bolt member is tightened within the nut-plate, the slide member prongs are pinched between the washer members, and the slide member is locked into position. However, whenever the bolt member is sufficiently loosened, the slide member can be adjusted and positioned to selectively orient the tube portion in various positions to engage selected tent poles or portions of a tent pole frame. In this manner, the anchors may be used to selectively adjust the direction of extension of tent poles secured thereon. If desired, the slide member may be removed from the assembly and replaced by a different slide member, for use with a different tent frame. It will be readily understood that anchors according to the present invention may be readily secured to, or removed from, a conventional pickup truck frame. Such anchors generally do not damage the pickup truck and further do not require any modifications in a conventional pickup truck frame. The anchors are relatively small and may be easily stored when not in use. When used as described, however, the anchors provide for secure attachment of a camper on a tent frame to a conventional pickup truck for use when camping or as an emergency shelter or the like.

The drawings constitute a part of this specification and include exemplary embodiments of the present invention and illustrate various objects and features thereof. In some instances material thickness may be shown exaggerated, or reduced relative to other portions of the instant device, for clarity.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but rather merely as a basis for the claims and as a representative basis for teaching one skilled in the art to variously employ the present invention in virtually any appropriately detailed structure.

The reference numeral 1, FIGS. 2 through 6 generally designates an anchor according to the present invention which is mountable within a pickup truck camper assembly to support tent poles or a tent pole frame therein. Before considering the features of the anchor 1 in detail, the environment in which the anchor 1 is used will be briefly described.

Figure 1:
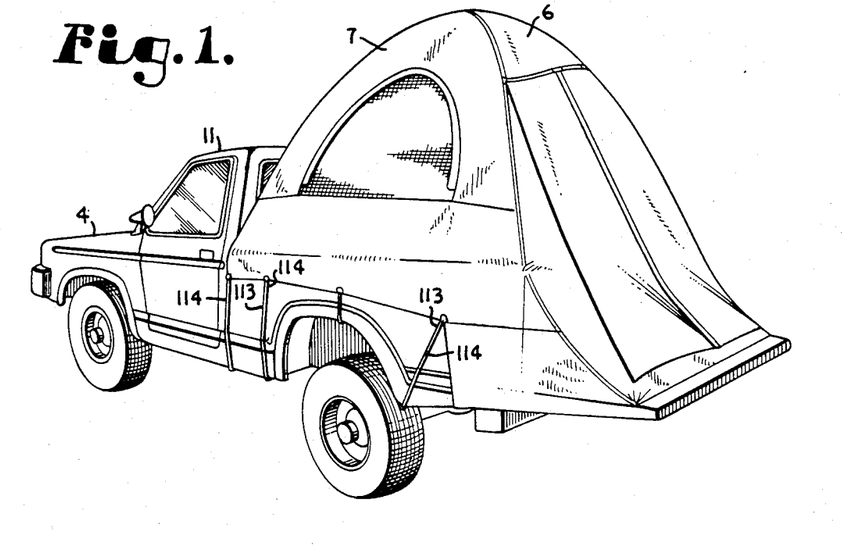
FIG. 1 is a perspective, environmental view showing a camper unit erected in a pickup truck and utilizing an assembly and method according to the present invention.
Figure 2:
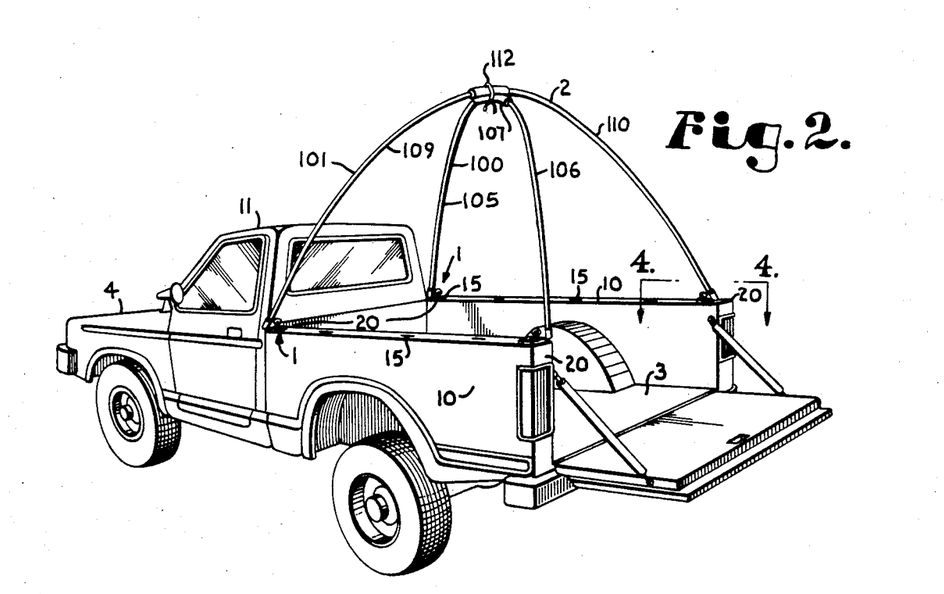
FIG. 2 generally is a perspective, environmental view analogous to FIG. 1 but with a canvas like cover of the camper removed to permit viewing of underlying features of the camper unit.

Referring to FIGS. 1 and 2, generally a plurality of anchors 1 are utilized to support a camper frame 2 over a bed 3 of a pickup truck 4. Referring to FIG. 1, in preferred use, the frame 2 supports a tent covering 6 to form an erected camper 7 on the truck 4. The camper unit 7, of course, may be used in conventional manners and may be of a variety of forms, as will be understood from the following description. It is noted that the camper unit 7 of the present invention may be relatively easily erected, or dissassembled, so that it may be easily collapsed during travel or erected when needed.

Referring to FIG. 2, the pickup truck 4 on which the anchors 1 and the frame 2 are mounted is of a generally conventional construction with a bed 3, sidewalls 10 and cab 11. The sidewalls 10 have stake-holes or stake receiving pockets 15 therein. Such pockets are generally found in conventional pickup truck sidewalls, and are often used to support vertical stakes therein, in order to accommodate loads that pile higher than the sidewalls 10 of the truck. In conventional pickup trucks, generally a plurality of stake receiving pockets 15 are found in each sidewall, with the pockets in opposite sidewalls being spaced generally an equal distance apart, to form two lines of stake receiving pockets, one in each sidewall.

The anchors 1 of the present invention are generally mounted in appropriate stake receiving pockets to support the frame 2 to be utilized in operational combination with the anchors 1 to support the camping unit 7. It will be understood from the below description that a variety of camper units 7, or frames 2, may be utilized in association with the anchors 1, and that different units 7 may necessitate different locations or orientations of the associated anchors 1. For the camper unit 7 and frame 2 depicted in the preferred embodiment, FIGS. 1 and 2, the anchors 1 are generally positioned at the four corners 20 of the sidewalls 10 to form a generally rectangular pattern.

It will be understood that while the present invention is described in relation to stake receiving pockets in a conventional pickup truck, it may be utilized with stake receiving pockets in a variety of trucks or vehicle frames.

Figures 3, 4, 5, 6:
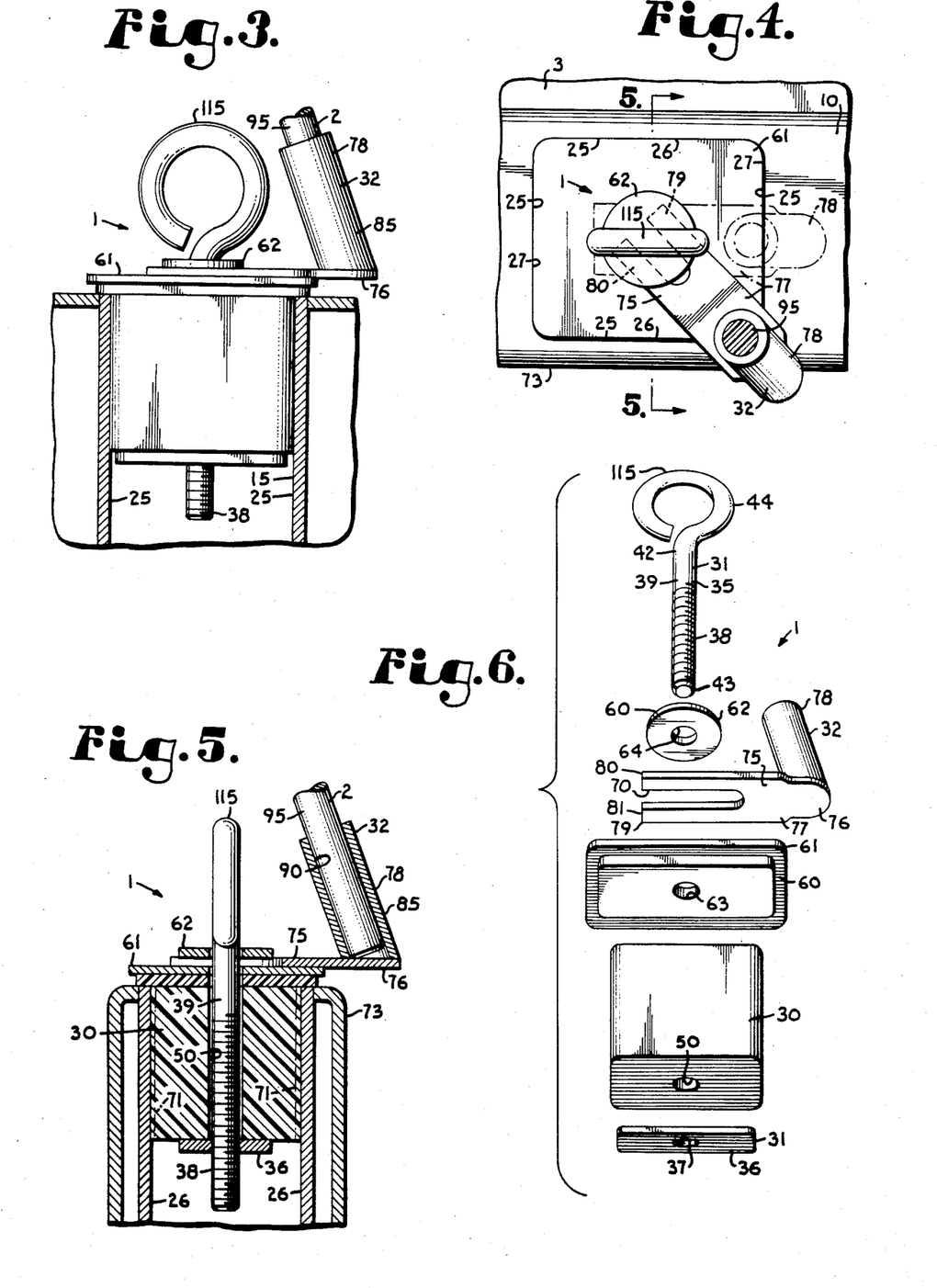
FIG. 3 comprises an enlarged, front elevational view of a pickup truck tent pole anchor according to the present invention, shown mounted in a portion of a pickup truck camper assembly, part of the pickup truck camper assembly being shown fragmentally and with portions broken away to view internal detail.
FIG. 4 comprises an enlarged, top elevational view of a pickup truck tent pole anchor according to the present invention, taken generally from the orientation of line 4—4 FIG. 2; a selectively movable portion of the anchor is shown in alternate orientations by solid and phantom lines.
FIG. 5 comprises an enlarged, side cross-sectional view of a pickup truck tent pole anchor shown mounted in a pickup truck and shown supporting a portion of a camper frame, and taken generally along line 5—5 of FIG. 3, and with a selectively movable portion of the assembly shown in an alternate position, relative to FIG. 3.
FIG. 6 comprises an enlarged, exploded, perspective view of a pickup truck tent pole anchor according to the present invention.

FIGS. 3 and 4 depict an anchor 1 mounted within one of the stake receiving pockets 15. The stake receiving pocket 15 depicted in FIGS. 3 and 4, is generally rectangularly shaped and has four opposite sidewalls 25. It will become apparent from the following description that stake receiving pockets, in which the anchors 1 are mounted, need not necessarily be rectangular in cross-section, and further they need not utilize four walls. Rather, as will become understood from the below description of the anchor 1, if the anchor 1 can be snugly received between a single pair of generally opposite sidewalls, the anchor 1 will generally be operational. For example, referring to FIG. 4, the anchor 1 could be trapped only between opposite sidewalls 26, or only between opposite sidewalls 27 if necessary. Therefore, pickup trucks having stake receiving holes which do not have four rectangularly arranged sidewalls may be used, provided the stake receiving holes present do have at least one pair of generally opposite sidewalls.

Referring to FIG. 6, the anchor 1 generally includes an expandable member 30, actuating means 31 for expanding the expandable member 30, and a tent pole or tent frame engaging member 32. In the preferred embodiment, the actuating means 31 for expanding the expandable member 30 comprises, in operational combination, a bolt member 35 and a nut member or nut plate 36. The nut plate 36 includes a threaded aperture 37 therein which is threadedly received upon a threaded portion 38 of the shaft 39 of the bolt member 35. Generally, the bolt member shaft 39 includes a first end 42 and a second end 43. A bolt head portion 44 is mounted on the first end 42. The second end 43 is threaded to receive the nut plate 36.

The expandable member 30 has a longitudinal bore 50 extending completely therethrough. Preferably, the expandable member 30 is formed from a material such as rubber or synthetic rubber, which, when compressed by forces directed along the extension of the longitudinal bore 50 generally expands in directions transverse thereto. Referring to FIG. 5, the longitudinal bore 50 is appropriately sized for receipt of the bolt shaft 39 therethrough.

Referring again to FIG. 6, the anchor 1 also includes a pair of washer members 60 comprising a plate 61 and a circular washer 62. The plate 61 includes a central aperture 63 therein, appropriately sized for extension of the bolt shaft 39 therethrough. Similarly, washer 62 includes central aperture 64. The tent pole engaging member 32 also includes a space 70 therein for receipt of the bolt shaft 39 therethrough. Preferably the tent pole engaging member 32 is capable of adjustment in orientation to accommodate varying tent frames, or to facilitate camper erection. It is noted that the tent pole engaging member 32 is shown in different positions in FIGS. 3, 4 and 5.

Referring to FIGS. 3, 5 and 6, the anchor 1 is assembled with a bolt member 35 extending generally completely therethrough. As the bolt member 35 is increasingly threaded into the nut plate 36, the expandable member 30 becomes pinched between the nut plate 36 and the washer plate 61. As the expandable member 30 continues to become compressed along the direction of its longitudinal bore 50, FIG. 3, it generally expands in directions transverse thereto. If the expandable member 30 is appropriately sized with respect to the stake receiving pocket 15, FIG. 3, as it expands transversely, it will engage the stake receiving pocket sidewalls 25, FIGS. 3 and 4, and press thereagainst. Eventually, tightening of the bolt member 35 into the nut plate 36 will sufficiently expand the expandable member 30, tranversely, to secure the expandable member within the stake receiving pocket 15 by frictional engagement with the sidewalls 25. In FIG. 5, phantom lines 71 are intended to show the plug member 30, prior to expansion.

It will be understood that such an arrangement of anchoring does substantially no damage to the pickup truck 4, and does not require any modifications in the conventional pickup truck 4, provided the pickup truck has generally conventional stake receiving pockets 15, with opposite sidewalls. It will be further understood, as indicated above, that the anchor 1 would operate even if the stake receiving pocket 15 only had one pair of opposite sidewalls, provided the expandable member 30 was appropriately sized to be fairly snugly received therebetween, before expanding. In FIG. 4, the outer wall of the truck is indicated by reference numeral 73. It is noted, however, that the orientation of the plug member 30 relative to the truck outer wall 73 is dictated, generally, only by the sidewalls 25 between which the plug member 30 expands. Since the tent pole engaging member 32 is adjustable in orientation, in the preferred embodiment, a variety of orientations of stake-holes 15 may be accommodated.

Referring to FIGS. 3, 4, and 5, the anchor 1 is used to appropriately secure in position the tent pole or frame engaging member 32, for engagement with the tent frame 2. In the preferred embodiment, the frame engaging member 32 comprises a slide 75 having a base portion 76, a slide portion 77 and a socket portion 78, FIG. 6. The slide portion 77 comprises first and second generally parallel prongs 79 and 80, with space 70 therebetween.

Referring to FIG. 6, preferably the space 70 in the slide 75 is elongated, and extends generally completely between elongate prongs 79 and 80. As a result, the slide 75 can be slid to have its end 81 moved toward or away from the bolt shaft 39 when it mounted upon the shaft 39 as in FIGS. 3 and 4. This, it will be understood, results in adjustment of the positioning of the socket 78 in the truck 4. Further, the slide 75 may be rotated around the bolt shaft 39, FIG. 4, again permitting selected adjustment and orientation and location of the socket 78.

In the preferred embodiment, FIGS. 4 and 5, the socket 78 comprises an elongate tube 85 mounted upon the base portion 76 of the slide 75. The tube 85 includes a central bore 90 appropriately sized for receipt of a portion of the frame 2 therein. That portion of the frame 2, which is received within the socket 78 is generally analogous to a tent pole 95 and is for supporting the flexible walls and roof of the camper unit 7. In FIGS. 3, 4 and 5 a portion of one of the tent poles 95 is shown received within the socket 78.

While a variety of designs of camper units 7 may be utilized in operational combination with anchors 1, according to the present invention, in the preferred embodiment, FIGS. 1 and 2, the camper unit 7 includes a frame 2 formed from first and second elongate arching cross members 100 and 101. Cross member 100 is generally an elongate arch formed from two end segments 105 and 106 joined together, in a conventional and generally co-axial manner, at joint 107. Similarly, cross member 101 is formed from first and second segments 109 and 110. Such an arrangement may be relatively easily constructed, using the anchors 1, as described below.

In the preferred embodiment, FIG. 2, four anchors 1 are located at the four corners 20 of the pickup truck sidewalls 10. The four anchors 1 generally define a rectangular pattern. The first cross member 100 arches diagonally between anchors 1 at diagonally opposite corners of the rectangular pattern. The second cross member 101 arches diagonally between a second pair of diagonally opposite end anchors 1. The cross members 100 and 101 generally cross one another over a center of the bed 3, and in the preferred embodiment they abut one another where they cross, and are tied together at the point of crossing by a piece of cord 112 or the like. The resulting frame 2 can readily support an appropriately designed covering 6, FIG. 1, to form a tent of camper unit 7 over the truck 4. It will be readily understood that such a unit 7 can be fairly rapidly assembled and disassembled from the components comprising the anchors 1, the cross members 100 and 101 and the covering 6. It is further noted that the covering 6 may be of a variety of types of materials and may include a variety of means of attaching same to the frame of the truck 4. In the embodiment shown, the attachment means 113 includes a plurality of strap and hook arrangements 114, FIG. 1.

It is foreseen that during assembly of the camper unit 7, the anchors 1 may need to be adjusted to permit easy mounting of the cross members 100 and 101, or mounting of the covering 6. Generally, this can be accomplished by sufficiently loosening the bolt member 35 to permit the position of the associated slide socket 78 to be adjusted. The bolt member 35 can then be appropriately tightened to secure the socket 78 in position, and also to anchor the expandable member 30 within the stake receiving pocket 15. If the angle of the socket 78 relative to the slide 75 is to be varied, for different frames, this can be accomplished by simply replacing the slide 75 and socket 76 in the anchors 1 with a different slide and socket (not shown). Similarly, engaging members other than tubes, may be introduced.

It is foreseen that, due in part to the adjustability of the orientation of the socket 78, the anchors 1 may be used to support a variety of types of tent frames. For example, the socket 78 may be adjusted to extend generally upwardly and toward the analogous anchor on the opposite side of the truck bed, rather than diagonally across the truck bed. With such a system, an A-frame tent pole arrangement, not shown, could then be used. Such an arrangement could then, foreseeably, use generally straight poles extending upwardly toward a center ridge of the tent. At this point, the joint would engage an opposite pole extending upwardly from an opposite sidewall of the truck. A conventional A-frame type tent covering (not shown) could be used for such an arrangement.

Generally, it is foreseen that the anchor 1 would be preferably made from sufficiently weather resistant materials as to be capable of being left mounted within the truck 4, for extended periods of time, even when not utilized to support the camper unit 7. Also it will be generally understood, by reference to FIGS. 1 and 2, that when the camper unit 7 is assembled, the anchor 1 is generally enclosed therein so it is not readily accessible to vandals, nor exposed to the weather. Further, adjustments in the anchor 1 can be made by a person within the tent.

It is foreseen that a variety of designs of the head member 44 for the bolt member 45 can be used, in conjuction with the present invention. In the preferred embodiment, the head portion 44 comprises an eye 115. Such an eye 115 can be relatively easily tightened and loosened, and also it provides an anchor point where utility cords or the like, (not shown), which may be located within and underneath the tent covering 6, may be anchored.

The above description taken in conjunction with the figures, discloses an operational combination of a tent pole anchor 1 arrangement with the tent pole frame 2 for supporting a tent 7 over a truck bed 3, such as a pickup truck bed. The specific operational combination disclosed utilizes four tent pole anchors 1 constructed according to the above description and positioned to support first and second arching cross members 100 and 101 extending therebetween. The cross members 100 and 101 generally extend between anchors 1 oriented diagonally opposite one another in a rectangular configuration. This operational combination can, as previous described, be used to support a covering 6 to form a camper 7.

The previous description and drawings also suggest a method of erecting a tent camper 7 in a truck bed 3, such as a pickup truck bed. The method generally includes the steps of providing a plurality of anchors 1 having the construction described; providing a tent pole frame 2 engageable with the anchors 1; providing a tent covering 6 mountable on the tent pole frame 2 to form a camper unit 7; mounting the anchors 1 in pickup truck stake receiving pockets 15 and adjusting them for receipt of the tent pole frame 2 thereon; engaging the tent pole frame 2 with the anchors 1; and, covering with the tent cover 6.

The method previously described results in the erection of a camper 7 or temporary shelter on a rear of a truck, such as a pickup truck, which has appropriate stake receiving pockets 15 therein, with little difficulty. Such a unit may be used as a camping shelter, an emergency shelter, a temporary storage facility of some type, or in various other manners as would be conventional for such shelters. The shelter can be very quickly assembled, and is easily disassembled for transportation. It will be understood that, generally, all parts of the assembly used in the method can be stored in a relatively small space.

It is to be understood that while certain forms of the present invention have been illustrated and described herein, it is not to be limited to the specific forms or arrangement of parts described and shown.

What is claimed and desired to be secured by Letters Patent is as follows:

1. A tent pole anchor for anchoring a selected tent pole to a pickup truck stake receiving pocket having opposite sidewalls; and tent pole anchor comprising:
   (a) an expandable plug member having a longitudinal bore extending therethrough;
      (i) said expandable plug member being selectively expandable in directions transverse to said longitudinal bore, whenever said plug is substantially compressed by forces directed along a direction of extension of said bore;
      (ii) said plug member being sized, when not substantially expanded, to be receivable within a selected stake receiving pocket in a pickup truck, with said longitudinal bore extending such that expansion of said plug member, when actuated, is generally toward the opposite sidewalls of the pocket;
   (b) a bolt member having a head portion and a shaft portion;
      (i) said bolt member being mounted on said plug member with said bolt member shaft portion extending through said plug bore;
      (ii) said shaft portion having first and second ends with said head portion being mounted on said shaft portion first end;
   (c) a nut plate threadibly engageable with said shaft portion second end;
      (i) said plug member, as said bolt member is increasingly threaded into said nut plate, being compressed along said longitudinal bore, and generally expanding in directions transverse thereto;
   (d) a slide member mounted in said anchor and engaging said bolt member substantially near said head portion; and
   (e) a tent pole receiving socket member mounted on said slide member;
      (i) said socket member being selectively engageable with a selected tent pole to support same;
   (f) whereby said anchor may be selectively secured to a pickup truck stake receiving pocket by selective actuation of said bolt member and said nut plate; and
   (g) whereby a tent pole may be selectively secured to said anchor by insertion of portion of the tent pole into said tent pole-receiving socket member, orienting the tent pole in a preferred position of extension for use in supporting a tent.

2. A tent pole anchor according to claim 1 wherein:
   (a) said slide member includes a base portion with first and second generally parallel prongs;
      (i) said slide member being adjustably mounted in said anchor with said bolt member extending between said prongs; and
      (ii) said tent pole receiving socket member being mounted on said slide member base portion;
   (b) said anchor includes a pair of washer members;
      (i) said washer members being mounted on said bolt member shaft portion substantially adjacent said head portion;
      (ii) said slide member prongs being positioned between said washer members;
   (c) whereby said slide member is selectively adjustable whenever said nut plate and bolt member are adjusted not to tightly pinch said slide member prongs between said washer members; and
   (d) whereby said slide member is selectively locked into a selected orientation by threading said bolt member into said nut plate to pinch said washer members toward one another.

3. A tent pole anchor according to claim 2 wherein:
   (a) said tent pole receiving socket portion comprises a cylindrical tube having first and second ends;
      (i) said cylindrical tube first end being mounted on said slide member base portion; and
      (ii) said tube being sized to receive a selected portion of a generally cylindrical tent pole therein;
   (b) whereby a selected tent pole may be mounted on said anchor by insertion of a selected portion of said tent pole into said tube.

4. A tent pole anchor according to claim 3 wherein:
   (a) said cylindrical tube is mounted on said base portion to orient said tube in a direction of extension generally over a truck in which said anchor is mounted.

5. A method of erecting a tent in a pickup truck bed having a plurality of stake receiving pockets therein, each pocket having generally opposite sidewalls; said method comprising the steps of:
   (a) providing a plurality of tent pole anchors, each of said tent pole anchors being mountable in a stake receiving pocket; each of said tent pole anchors including: an expandable plug member having a longitudinal bore extending therethrough; a bolt member having a head portion and a shaft portion; a nut plate threadably engageable with said shaft portion; a slide member mounted in said anchor and engaging said bolt member substantially near said head portion; and, a tent pole receiving socket member mounted on said slide member;
  (i) each of said expandable plug members being selectively expandable in directions transverse to said longitudinal bore, whenever said plug is substantially compressed by forces directed along a direction of extension of said bore;
  (ii) each of said plug members being sized, when not substantially expanded, to be receivable within a selected stake receiving pocket in the pickup truck, with said longitudinal bore extending such that expansion of said plug member, when actuated, is generally toward the opposite walls of the pocket;
  (iii) each of said bolt members being mounted in an associated plug member with said bolt member shaft portion extending through said plug bore;
  (iv) each of said bolt member shaft portions having first and second ends with said head portion being mounted on said shaft portion first end;
  (v) each of said plug members, as one of said nut plates is threadably engaged with the associated bolt member, being compressible along said longitudinal bore, and, generally expandable in directions transverse thereto;
  (vi) each of said slide members including a base portion with first and second generally parallel prongs; each of said slide members being adjustably mounted in an associated anchor with an associated bolt member extending between said prongs; one of said tent pole receiving sockets being mounted on each slide member base portion;
  (vii) each of said socket members being selectively engageable with a selected portion of said tent pole frame to support same;
(b) providing a tent pole frame engageable with said socket members to support said tent in the pickup truck;
(c) providing a tent covering mountable on said tent pole frame to form said tent;
(d) placing said tent pole anchors in appropriate stake receiving pockets in the pickup truck;
(e) adjusting said anchor bolt member of each of said anchors to secure said anchors in said stake receiving pockets and to orient said socket members for engagement with said tent pole frame;
(f) erecting said tent pole frame on said tent pole anchors; and,
(g) covering said tent pole frame with said tent covering to form the tent.

6. The method according to claim 5 wherein:
(a) said tent pole frame comprises first and second arching cross members; and
(b) said step of erecting said tent pole frame on said tent pole anchors includes extending said first and arching second cross members diagonally across a rectangular arrangement of tent pole anchors.

7. An operational combination of a tent pole anchor arrangement and a tent pole frame for supporting a tent over a pickup truck bed, the pickup truck having at least four appropriately positioned stake receiving pockets with opposite sidewalls; said operational combination being wherein:
(a) said tent pole anchor arrangement comprises four substantially similar tent pole anchors positioned for supporting said tent pole frame; each of said tent pole anchors including: an expandable plug member having a longitudinal bore extending therethrough; a bolt member having a head portion and a shaft portion; a nut plate threadably engageable with said shaft portion; a slide member mounted in said anchor and engaging said bolt member substantially near said head portion; a tent pole receiving socket member mounted on said slide member; and, a pair of washer members;
  (i) each of said expandable plug members being selectively expandable in directions transverse to said longitudinal bore, whenever said plug is substantially compressed by forces directed along a direction of extension of said bore;
  (ii) each of said plug members being sized, when not substantially expanded, to be receivable within a selected stake receiving pocket in a pickup truck, with said longitudinal bore extending such that expansion of said plug member, when actuated, is generally toward the opposite walls of the pocket; said operational combination having said four tent pole anchors oriented in a generally retangular pattern at four corners of said tent;
  (iii) each of said bolt members being mounted in a plug member with said bolt member shaft portion extending through said plug bore;
  (iv) each of said bolt member shaft portions having first and second ends with said head portion being mounted on said shaft portion first end;
  (v) each of said plug members, as one of said nut plates is threadably engaged with the associated bolt member, being compressable along said longitudinal bore, and, generally expandable in directions transverse thereto;
  (vi) each of said slide members engaging an associated one of said bolt members substantially near said head portion;
  (vii) each of said socket members being selectively engageable with a selected portion of said tent pole frame to support same;
  (viii) each of said slide members including a base portion with first and second generally parallel prongs; each of said slide members being adjustably mounted in an associated anchor with an associated bolt member extending between said prongs;
  (ix) one of said tent pole receiving sockets being mounted on each slide member base portion;
  (x) each of said pairs of washer members being mounted on an associated bolt member shaft portion substantially adjacent said head portion;
  (xi) said slide member prongs of each slide member being positioned between an associated pair of washer members; and
(b) said tent pole frame includes a first arching cross member and a second arching cross member;
  (i) said first cross member having first and second ends and being oriented to arc between a first pair of said tent pole anchors; said first pair of tent pole anchors being first and second tent pole anchors oriented at diagonally opposite corners of said rectangular pattern of tent pole anchors; said first cross member first and second ends each being securely engaged by a tent pole receiving socket member on an associated tent pole anchor;

(ii) each of said first cross members including first and second separable segment portions having means for joining to one another, in a generally coaxial manner, to form said first cross member;

(iii) said second cross member having first and second ends and being oriented to arc between a second pair of tent pole anchors; said second pair of tent pole anchors being third and fourth tent pole anchors oriented at diagonally opposite corners of said rectangular pattern of tent pole anchors; said second cross member first and second ends each being securely engaged by a tent pole receiving socket member on an associated tent pole anchor;

(iv) said second cross member including third and fourth separable segment portions having means for joining to one another, in a generally coaxial manner, to form said second cross member;

(v) said first and second cross members forming an arched cross, with said first and second cross members crossing one another substantially over a midpoint of said rectangular pattern;

(c) whereby said anchors may be selectively secured to pickup truck stake receiving pockets by selective actuation of said bolt member and said nut plates;

(d) whereby said tent pole frame may be selectively secured to said anchors in a preferred position of extension for use in supporting a tent over the pickup truck bed;

(e) whereby a tent covering may be supported by said operational combination of a tent pole anchor arrangement and a tent pole frame, to form the tent;

(f) whereby said slide members are selectively adjustable whenever associated nut plates and bolt members are selectively adjusted not to tightly pinch said slide member prongs between said washer members;

(g) whereby said slide members are selectively lockable into selected orientations for supporting said cross members, to form said tent pole frame, when said bolt members are selectively tightly threaded into said nut plates to pinch said washer members toward one another; and, (h) whereby said first and second cross members are each capable of being selectively disassembled for storage.

8. An operational combination of a tent pole anchor arrangement and a tent pole frame for supporting a tent over a pickup truck bed, the pickup truck having at least four appropriately positioned stake receiving pockets with opposite sidewalls; said operational combination being wherein:

(a) said tent pole anchor arrangement comprises four substantially similar tent pole anchors positioned for supporting said tent pole frame; each of said tent pole anchors including: an expandable plug member having a longitudinal bore extending therethrough, a bolt member having a head portion and a shaft portion; a nut plate threadably engageable with said shaft portion; a slide member mounted in said anchor and engaging said bolt member substantially near said head portion; and a tent pole receiving socket member mounted on said slide member;

(i) each of said expandable plug members being selectively expandable in directions transverse to said longitudinal bore, whenever said plug is substantially compressed by forces directed along a direction of extension of said bore;

(ii) each of said plug members being sized, when not substantially expanded, to be receivable within a selected stake receiving pocket in a pickup truck, with said longitudinal bore extending such that expansion of said plug member, when actuated, is generally toward the opposite walls of the pocket; said operational combination having said four tent pole anchors oriented in a generally retangular pattern at four corners of said tent;

(iii) each of said bolt members being mounted in a plug member with said bolt member shaft portion extending through said plug bore;

(iv) each of said bolt member shaft portions having first and second ends with said head portion being mounted on said shaft portion first end;

(v) each of said plug members, or one of said nut plates is threadably engaged with the associated bolt member, being compressable along said longitudinal bore, and, generally expandable in directions transverse thereto;

(vi) each of said slide members engaging an associated one of said bolt members substantially near said head portion;

(vii) each of said socket members being selectively engageable with a selected portion of said tent pole frame to support same;

(viii) each of said slide members including a base portion with first and second generally parallel prongs; each of said slide members being adjustably mounted in an associated anchor with an associated bolt member extending between said prongs;

(ix) one of said tent pole receiving sockets being mounted on each slide member base portion;

(b) said tent pole frame includes a first arching cross member and a second arching cross member;

(i) said first cross member having first and second ends and being oriented to arc between a first pair of said tent pole anchors; said first pair of tent pole anchors being first and second tent pole anchors oriented at diagonally opposite corners of said rectangular pattern of tent pole anchors; said first cross member first and second ends each being securely engaged by a tent pole receiving socket member on an associated tent pole anchor;

(ii) said second cross member having first and second ends and being oriented to arc between a second pair of tent pole anchors; said second pair of tent pole anchors being third and fourth tent pole anchors oriented at diagonally opposite corners of said rectangular pattern of tent pole anchors; said second cross member first and second ends each being securely engaged by a tent pole receiving socket member on an associated tent pole anchor;

(iii) said first and second cross members forming an arched cross, with said first and second cross members crossing one another substantially over a midpoint of said rectangular pattern;

(c) whereby said anchors may be selectively secured to pickup truck stake receiving pockets by selective actuation of said bolt member and said nut plates;

(d) whereby said tent pole frame may be selectively secured to said anchors in a preferred position of extension for use in supporting a tent over the pickup truck bed;

(e) whereby a tent covering may be supported by said operational combination of a tent pole anchor arrangement and a tent pole frame, to form the tent;

(f) whereby said slide members are selectively adjustable whenever associated nut plates and bolt members are selectively adjusted not to tightly pinch said slide member prongs therebetween; and (g) whereby said slide members are selectively lockable into selected orientations for supporting said cross members, to form said tent pole frame, when said bolt members are selectively tightly threaded into said nut plates to tightly pinch slide member prongs.

9. A tent pole anchor for anchoring a selected tent pole to a pickup truck stake receiving pocket; and tent pole anchor comprising:

(a) an expandable plug member receivable within the stake receiving pocket and selectively expandable therein to secure said anchor to the pocket;

(b) a bolt member having a head portion;
  (i) said bolt member being mounted on said plug member;

(c) means for selectively actuating said expandable plug member;

(d) a slide member mounted in said anchor and engaging said bolt member substantially near said head portion; and (e) a tent pole receiving socket member mounted on said slide member;
  (i) said socket member being selectively engageable with a selected tent pole to support same;

(f) whereby said anchor may be selectively secured to a pickup truck stake receiving pocket by selective actuation of said expandable plug member; and (g) whereby a tent pole may be selectively secured to said anchor by insertion of portion of the tent pole into said tent pole-receiving socket member, orienting the tent pole in a preferred position of extension for use in supporting a tent, (h) said slide member including a base portion with first and second generally parallel prongs;
  (i) said slide member being adjustably mounted in said anchor with said bolt member extending between said prongs; and
  (ii) said tent pole receiving socket member being mounted on said slide member base portion;

(i) said anchor includes a pair of washer members;
  (i) said washer members being mounted on said bolt member substantially adjacent said head portion;
  (ii) said slide member prongs being positioned between said washer members;

(j) a nut member is mounted on said bolt member;

(k) whereby said slide member is selectively adjustable whenever said bolt member and nut member are adjusted not to tightly pinch said slide member prongs between said washer members; and (l) whereby said slide member is selectively locked into a selected orientation by selectively tightening said bolt member and said nut member to pinch said washer members toward one another.

10. A tent pole anchor according to claim 9 wherein:

(a) said tent pole receiving socket portion comprises a cylindrical tube having first and second ends;
  (i) said cylindrical tube first end being mounted on said slide member base portion; and
  (ii) said tube being sized to receive a selected portion of a generally cylindrical tent pole therein;

(b) whereby a selected tent pole may be mounted on said anchor by insertion of a selected portion of said tent pole into said tube.

11. A tent pole anchor according to claim 10 wherein:

(a) said cylindrical tube is mounted on said base portion to orient said tube in a direction of extension generally over a truck in which said anchor is mounted.

* * * * *